April 30, 1968 W. J. DAVIS 3,380,843
BEARING
Filed March 31, 1964

INVENTOR.
WILLIAM J. DAVIS
BY
Richard O. Church 3,380,843
BEARING
William J. Davis, Wyomissing, Pa., assignor, by mesne
assignments, to The Polymer Corporation, a corporation of Pennsylvania
Filed Mar. 31, 1964, Ser. No. 356,261
13 Claims. (Cl. 117—33)

ABSTRACT OF THE DISCLOSURE

Bearings with a captive source of fluid lubricant are provided by adhering finely divided synthetic resinous absorptive materials to the surface of a substrate.

---

This invention relates to improved bearings and methods and means for their fabrication. More particularly, this invention is concerned with that class of bearings in which a supply of a fluid lubricant is integrally contained therein.

It is known in the prior art that finely divided metals may be sintered under appropriate conditions of heat and pressure to yield a porous structure that can be impregnated with a lubricant. This type of bearing has proved of utility in certain limited applications, but is generally found lacking in that the fugitive lubricant is not tightly held in the interstices of the sintered metal. As a result, the lubricant may "bleed" out of the bearing under no load conditions or may be extracted therefrom by centrifugal forces if the bearing is subjected to rotation. For this reason, it is generally necessary to provide means to replace the supply of lubricant in such "self-lubricated" bearings, either continuously or at frequent intervals.

Metal bearings have also been lined with certain solid non-metallic substances that have low coefficients of friction and will serve as lubricants. As examples of this type of bearing are those that are lined with low friction resinous materials such as polyethylene, polytetrafluoroethylene, and polyamides. Under comparatively light loads, these bearings have sometimes proved satisfactory, but, unfortunately, they do not have the necessary wear resistance and toughness to permit their use under moderate to severe pressure-velocity conditions. As a result, their utility has been considerably limited.

A third type of highly useful self-lubricated bearing may be prepared by sintering finely divided non-metallic materials to yield a porous bearing similar to the sintered metallic bearings mentioned above. Of particular interest in this regard are bearings comprised of sintered polyamides. Unlike the porous metal bearings, they are highly retentive with respect to the lubricants contained within their interstices. Being non-metallic, however, their heat conductivity is low and their coefficient of thermal expansion is high. As a result, if close tolerances are required, these bearings often may prove unsatisfactory.

It has now been discovered that a more idealized approach to self-lubricated bearings can be achieved, and that the combined useful properties referred to above can be retained while eliminating most of the disadvantages. Further, it has been found that the improved bearings of this invention may be prepared by simple and economical means.

Accordingly, it is an object of this invention to provide an improved bearing.

It is a further object of this invention to provide an improved bearing in which a fluid lubricant is integrally contained therein.

A still further object of this invention is to provide self-lubricated, low friction bearings that have high coefficients of heat transfer, low coefficients of thermal expansion, and a high degree of retention for fluid lubricants.

Still another object of this invention is to provide a bearing surface that is provided with means to insure a uniform distribution of a fluid lubricant thereover.

And yet another object of this invention is to provide improved methods and means for the fabrication of porous bearings containing a fluid fugitive lubricant.

Briefly, these and other objects of this invention are achieved by applying a layer of adhesive material to a metal substrate, contacting the adhesive layer with a finely divided absorptive synthetic resinous material, and causing the adhesive material to harden, whereby a layer of finely divided synthetic resinous material is bonded to at least the surface of said substrate. The metal substrate may be shaped into the form of a bearing either before or after the finely divided resinous material is applied to its surface.

It is generally preferred that the absorptive synthetic resinous materials selected for use in this invention have low coefficients of friction, be sufficiently tough and durable to withstand imposed conditions of use, and be available or capable of being prepared in very finely divided form in order to provide the necessary absorptive properties to retain fluid lubricants.

As examples of resins that may advantageously be used in the practice of this invention and that may be conveniently prepared or obtained in very finely divided form may be mentioned the polyamides, polyacetyls, polycarbonates, and some of the polyfluorides. Of these, the polyamide resins are particularly useful, and this invention will be described with particular reference thereto, though it is to be understood that the same principles may be applied to other suitable resins.

The selection of a suitable adhesive material is not critical, but the adhesive that is chosen should have sufficient adhesive strength to hold the finely divided resins firmly embedded therein; it should have a sufficiently high heat distortion temperature to withstand bearing temperatures; and it should be resistant to chemical attack by oils, greases, and solvents as may come in contact with the bearing.

Generally, the adhesives that will be useful are comprised of resinous materials, either thermosetting or thermoplastic. They can be applied as liquids and then caused to set up after contact with the absorptive materials or, alternately, they can be applied in solid form and caused to pass through a liquid phase by means of heat. If the solid resin is thermosetting, a Stage A or Stage B resin can be melted on a metal surface and, after contact with the finely divided absorptive resins, fully cured and hardened. In the case of thermoplastic resins, these resins may be melted on a hot metal surface and, after contact with the finely divided absorptive material, solidified by cooling.

The polyamides, which are the preferred absorptive materials of this invention, may include any of the synthetic linear fiber-forming polyamides and their various homopolymers, copolymers, and interpolymers. Of the more common of these polymers which are readily available in commercial quantities, may be mentioned the polymer of hexamethylenediamine and adipic acid (nylon 6/6); the polymer of hexamethylenediamine and sebacic acid (nylon 6/10); the polymer of ε-caprolactam (nylon 6); the polymer of 11-aminoundecanoic acid (nylon 11); and the polymer of caprylactam (nylon 8).

To obtain the absorptive properties in accordance with this invention, it is important that the polyamide resin be prepared in a very finely divided form in order that a high surface to volume ratio will be presented. While polyamide resin in finely divided form may be prepared by mechanical comminution, it is generally impractical to use such mechanical means to prepare polyamide powders of the extremely small size required in the practice of this invention.

Perhaps the easiest and best means to prepare finely divided polyamide powders suitable for use in this invention is by precipitation processes, wherein the polyamides are dissolved in solvents at elevated temperatures and precipitated from solution. The materials so obtained are in extremely finely divided form and may be less than one micron in diameter. Suitable solvents for use in these processes are generally alcohols, and preferably the polyhydric alcohols. Of these, one of the most effective and convenient to use is ethylene glycol, which will dissolve about 1/3 of its own weight of nylon at temperatures approaching its boiling point. These precipitation processes are described in detail in U.S. Letters Patent 2,639,278, which is incorporated herein by reference.

During the precipitation processes, it is believed that the extremely finely divided nylon particles precipitated from solution loosely form together as agglomerates, even though these agglomerates themselves may be no larger than one micron.

The agglomeration of the finely divided particles continues during filtration of the precipitates and during the drying of the wet filter cake.

While the material so filtered and dried is extremely effective as an absorbent, the absorbent properties of the material can still further be increased by a heat treatment as in accordance with U.S. Patent 3,022,542. This latter patent describes a process for preparing highly porous pressed and sintered articles by heat treating the finely divided polyamides precipitated from solution prior to pressing and sintering the shaped article. As mentioned in this patent, it is theorized that the small agglomerates previously referred to that result during precipitation and filtration are hardened and strengthened by the heat treatment without disturbing the minute spaces or pores therebetween. Thus, in subsequent handling of these agglomerates, their porosity is preserved, insuring an extremely high surface to volume ratio.

For convenience, it may sometimes be convenient to conduct the heat treatment operation after the filter cake has been pressed into a pellet. Either the pellet or the powder is heat treated in a non-oxidizing atmosphere until the strength of the agglomerates is increased.

In order to obtain a uniform coating over the bearing surface, it is important that the polyamide be applied to the surface in the form of a fine powder. For this reason, if the powder has been pelletized prior to the heat treatment, it is necessary to comminute the pellets thereafter to form a powder once again. It should be noted that even though the powder is pelletized prior to the heat treatment, the microporosity and absorptive properties of the polyamide are not adversely affected. While the exact size of this powder is not critical, an average particle size in the range of 100 to 325 mesh is convenient and satisfactory.

After the finely divided absorptive material has been so prepared, it may be distributed over the surface of a bearing that has been pretreated with an adhesive. As mentioned above, the adhesive may be applied as a liquid and then caused to set up, either by means of volatilization of a solvent, or, in the case of a thermosetting material, by chemical reaction. Alternatively, the adhesive may be applied as a solid and caused to melt over the bearing surface by means of heat, and subsequently solidified, either by cooling and/or curing in the case of a thermosetting resin. In any instance, it may be appreciated that the absorptive material must be applied to the adhesive while the adhesive is fluid, and of sufficiently low viscosity to enable penetration of the absorptive material into the surface thereof. On the other hand, however, the adhesive should not be too fluid, nor should it have too great an affinity for wetting the absorptive material, for, in these instances, the adhesive may flow into the pores of the coating materials and destroy the absorptive properties.

While the absorptive coating material is applied to the surface of the adhesive, it is desired that some of this material should penetrate into the adhesive in order that it may act as a reservoir for additional quantities of lubricant. If the thickness of the adhesive material is in the preferred range of from about 2 to 20 mils, the absorptive material may be present in an amount from 10% to 75% by weight of adhesive. Generally, a thicker layer of adhesive will enable the application of a greater amount of coating material, which, in turn, will increase the oil absorptive properties of the bearing. However, care must be used not to make the layer of adhesive too thick, as it will give rise to problems encountered with certain bearings of the prior art due to poor heat conductivity and excessive thermal expansion.

The absorptive coating material may be applied to the adhesive by any means that will insure a uniform contact of the absorptive material with the adhesive. It has been found that one of the most convenient means for accomplishing this is by means of the fluidized bed coating process, wherein the bearing containing the adhesive material is immersed in a fluidized bed of the absorptive coating material while the adhesive material is in a liquid or softened condition.

One particular advantage to the preparation of bearings in accordance with this invention lies in the fact that the bearings may be given a surface treatment with the absorptive materials either before or after they are formed. For example, flat sheets of metal may be coated and then formed into the desired shape of bearing. Alternatively, more complicated bearing surfaces, such as ball races, may first be fabricated and then coated with the absorptive material in accordance with this invention.

It may sometimes be desirable to machine the surface of the coated bearing after application of the absorptive material. This can be done either to insure that the bearing surface is smooth or to provide for exact dimensional tolerances of the bearing. Care must be taken, however, so that the machining operation will not damage the absorptive surface, either by dislodging the absorptive material or by melting it at its surface, thus closing the pores.

Figure 1:
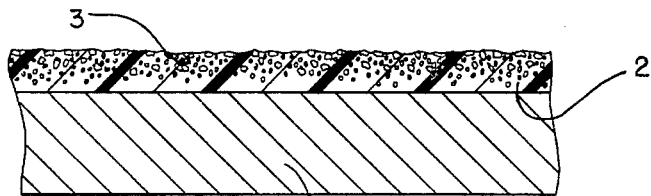
FIG. 1 is an enlarged view in section showing a portion of a bearing formed in accordance with this invention.

In FIG. 1, there is shown a schematic view in section of a portion of a bearing prepared in accordance with this invention. The bearing is comprised of a metal substrate 1 that is coated with an adhesive material 2. Oil is retained in this bearing by means of finely divided absorptive material 3 which is shown on the surface of and embedded in the adhesive layer 2.

Figure 2:
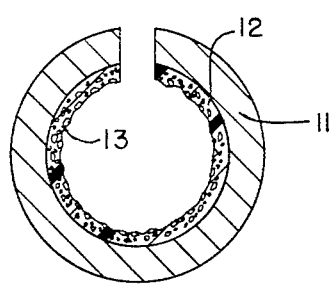
FIG. 2 is a sectional view of a rolled bearing formed in accordance with this invention.

FIG. 2 shows a similar type bearing in which the metal 11 has been rolled into the form of a sleeve bearing, with an interior bearing surface comprised of adhesive material 12 and finely divided oil-absorptive material 13 embedded therein.

Figure 3:
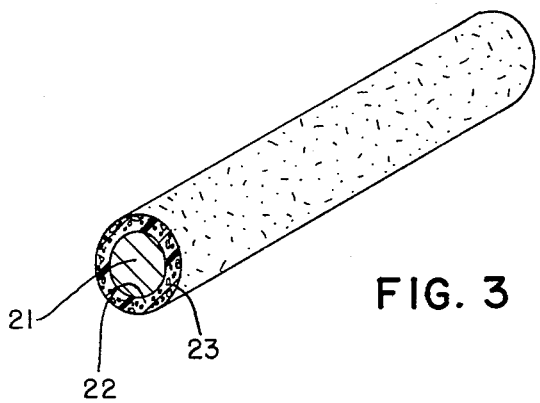
FIG. 3 is a perspective view, partially in section, of a rod bearing that has been coated in accordance with this invention.

FIG. 3 illustrates a rod bearing in which a metal rod 21 has been coated with a surface layer of adhesive 22. Oil may be retained on the outer surface of this rod bearing by means of finely divided absorptive material 23 that is uniformly distributed over the surface and penetrates into the adhesive layer 22.

Figure 4:
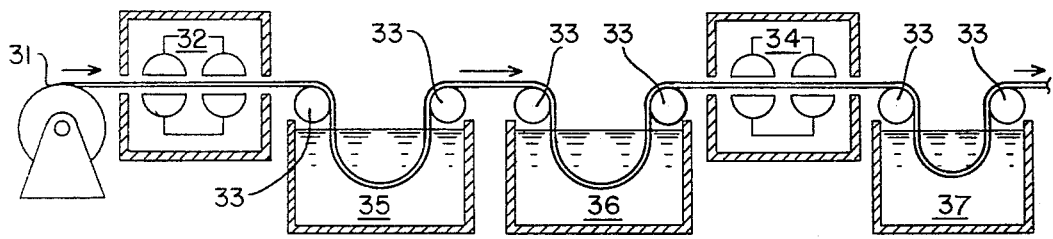
FIG. 4 is a schematic drawing illustrating a suitable flow sheet for coating metal strip in accordance with this invention.

In FIG. 4, there is schematically shown apparatus for continuously treating a metal strip in accordance with this invention. The metal strip 31 treated therein may be coated on both sides and then fabricated, utilizing conventional techniques, into suitable form for bearing purposes.

An elongated strip of metal 31 is passed through an oven 32 that raises the temperature of the strip to above the fusion temperature of a solid epoxy resin contained within fluidized bed 35. The heated strip leaves preheat oven 32, passes over guide 33, and into fluidized bed vessel 35. The heat contained within the strip causes the epoxy resin to soften and adhere to the strip 31, and then coalesce into a uniform coating over the surface of the strip. The metal strip is led from tank 35 over guides 33 and into a fluidized bed 36 comprised of finely divided absorptive polyamide material prepared as described above. The strip 31 is introduced into the fluidized bed of polyamide resin while the epoxy adhesive is sufficiently fluid to allow the polyamide resin to adhere to and penetrate into its surface.

The strip 31, now coated with epoxy adhesive and polyamide resin, is led over guide 33 into a postheat oven 34 where the epoxy adhesive is fully cured, thus securely binding the particles of absorptive polyamide resin. The coated strip 31 is led from the oven 35, cooled, and introduced into a tank 37 containing an oil or other suitable liquid lubricant, where the oil is absorbed into the pores of the coated strip 31. The strip 31 is then led from the oil bath, and is suitable for conversion into any desired bearing shape by standard fabricating techniques. Alternatively, contact with the oil bath may be delayed until after the bearing structure has been formed.

EXAMPLE

Preparation of absorptive polyamide

One pound of type 6/6 polyamide molding powder was added to five pounds glycol and the mixture gently stirred while its temperature was raised to about 380° F. The stirring was continued for about one hour, and after that time all of the polyamide was dissolved by the glycol. The hot solution was then filtered to remove any foreign matter. The clear solution was placed in a quench tank where the temperature was rapidly reduced to less than 300° F. by the addition of cold water to the solution. A fine precipitate immediately formed and was separated from the mother liquor by means of filtration. The filter cake was washed to remove all the glycol and then as much water as possible was removed by means of a filter press. The wet filter cake removed from the filter press was, for convenience, pressed into small pellets about ½ to ¼ inch in size. These pellets were then heated under nonoxidizing conditions at a temperature approaching the melting point of the polyamide, which in this case was about 450° F. After one hour of this heat treatment, the pellets were removed from the oven and ground to a sufficiently small size so that they would pass through a 100 mesh screen.

Application of absorptive polyamide to bearing surface

A flat metal plate, approximately 2" x 4" x ¹⁄₁₆", was carefully cleaned and degreased, heated in an oven at a temperature of about 400° F. for abouut 20 minutes. The plate was removed from the oven and immediately immersed in a fluidized bed of a finely divided epoxy resin. This resin was comprised of a solid epoxy resin to which had been blended 5% by weight dicyandiamide as a curing agent. This curing agent is comparatively inert at room temperature, but is highly reactive at temperatures above the melting point of the epoxy resin.

The heated plate was immersed in this fluid bed for about 2 seconds, during which time a coating of the epoxy adhesive melted over and adhered to the surface of the plate. While the adhesive was still fluid, the plate was immersed in a fluidized bed of absorptive polyamide resins prepared as described above. The plate was removed from this bed of absorptive polyamide after 10 seconds and then placed in an oven heated to 300° F. for about an hour. This caused the epoxy adhesive to cure fully, and thus securely bind the polyamide into the surface of the plate.

After the plate had cooled, it was examined and found to have about a 12 mil coating of epoxy adhesive on its surface embedded with a layer of the polyamide. It was estimated that the coating was comprised of between about 25 to 75% by weight polyamide particles.

The plate was then immersed in an oil bath and was found to absorb an appreciable quantity of oil (about 40% based on the weight of the coating). The action of the plate in absorbing the oil was much like a blotter, as the oil rapidly spread over the absorptive surface and into the interstices of the polyamide material. When removed from the oil bath, the oil did not "bleed" from the porous polyamide surface, and it was only slightly oily to the touch. However, when pressure was applied to the bearing surface, oil exuded at the pressure point, but was immediately re-absorbed when the pressure was released. The coated plate was then bent into the form of a sleeve bearing without an adverse effect to the coating.

In addition to the use of an epoxy adhesive, equally satisfactory results may be achieved by using other resins as the adhesive. For example, an adhesive layer of the polymer of 11-aminoundecanoic acid (nylon 11) may be applied by the use of the fluidized bed process. In this case, however, the plate must be heated somewhat hotter, e.g., 600° F., before it is contacted with the adhesive. However, a post-heat or curing step is not required. Also, as can be understood, the adhesive may be applied from a solution and caused to harden or set up after contact with the absorptive materials as by evaporation of the solvent.

I claim:

1. A method for the formation of a low friction bearing comprising the steps of coating a metal substrate with a synthetic resinous adhesive, contacting the adhesive and distributing over at least the surface thereof a finely divided synthetic resinous fluid lubricant-absorptive material, hardening said adhesive to hold the absorptive material thereon, and impregnating said absorptive material with a fluid lubricant.

2. A method according to claim 1 in which the bearing is given its final shape after the adhesive has been hardened to hold the absorptive material.

3. A method according to claim 1 in which the absorptive material is contacted with the adhesive while the absorptive material is fluidized.

4. A method according to claim 1 in which the adhesive is applied to the metal substrate by means of the fluidized bed coating process.

5. A method according to claim 1 in which said absorptive material is a chemically precipitated polyamide.

6. A method according to claim 1 in which said adhesive is an epoxy resin.

7. A bearing comprised of a metal base having a first coating layer comprised of a synthetic resinous adhesive material and a second coating layer held by and distributed over at least the surface portion of said first coating layer, said second coating layer being comprised of a finely divided, absorbent, synthetic resinous material.

8. A bearing according to claim 7 in which said second coating layer is filled with a fluid lubricant.

9. A bearing according to claim 7 in which said absorbent materials are selected from the class consisting of polyamides, polyacetals, and polycarbonates.

10. A bearing according to claim 9 in which said absorbent material is a chemically precipitated polyamide.

11. A bearing according to claim 7 in which said first coating layer is comprised of an epoxy.

12. A bearing according to claim 7 in which said first coating layer is comprised of a polyamide.

13. A bearing according to claim 7 in which said second coating layer is between about 2 to about 20 mils in thickness.

References Cited

UNITED STATES PATENTS 2,956,848　10/1960　St. Clair _____ 252—12 X

RALPH S. KENDALL, *Primary Examiner*.